(12) United States Patent
Eick et al.

(10) Patent No.: US 8,773,132 B2
(45) Date of Patent: Jul. 8, 2014

(54) FRACTURE DETECTION VIA SELF-POTENTIAL METHODS WITH AN ELECTRICALLY REACTIVE PROPPANT

(75) Inventors: Peter M. Eick, Houston, TX (US); Joel D. Brewer, Houston, TX (US); Frank D. Janiszewski, Richmond, TX (US)

(73) Assignee: Conocophillips Company, Houston, TX (US)

( * ) Notice: Subject to any disclaimer, the term of this patent is extended or adjusted under 35 U.S.C. 154(b) by 408 days.

(21) Appl. No.: 13/327,985

(22) Filed: Dec. 16, 2011

(65) Prior Publication Data

US 2012/0169343 A1    Jul. 5, 2012

Related U.S. Application Data

(60) Provisional application No. 61/429,938, filed on Jan. 5, 2011.

(51) Int. Cl.
*G01V 3/18* (2006.01)

(52) U.S. Cl.
USPC ........................................................ 324/324

(58) Field of Classification Search
CPC .......... G01V 3/26; G01V 3/30; E21B 43/267; E21B 29/06; E21B 49/00; E21B 47/02; B01J 13/02
See application file for complete search history.

(56) References Cited

U.S. PATENT DOCUMENTS

| | | | |
|---|---|---|---|
| 4,446,433 A | 5/1984 | Shuck | |
| 6,116,342 A | 9/2000 | Clark et al. | |
| 6,330,914 B1 | 12/2001 | Hocking et al. | |
| 7,073,581 B2 | 7/2006 | Nguyen et al. | |
| 7,082,993 B2 | 8/2006 | Ayoub et al. | |
| 7,210,526 B2 | 5/2007 | Knobloch | |
| 7,424,911 B2 * | 9/2008 | McCarthy et al. | 166/250.12 |
| 7,450,053 B2 | 11/2008 | Funk et al. | |
| 7,451,812 B2 | 11/2008 | Cooper et al. | |
| 7,712,527 B2 | 5/2010 | Roddy | |
| 7,726,397 B2 | 6/2010 | McDaniel et al. | |
| 7,754,659 B2 | 7/2010 | Rediger et al. | |
| 8,168,570 B2 * | 5/2012 | Barron et al. | 507/269 |
| 2005/0017723 A1 | 1/2005 | Entov et al. | |
| 2007/0256830 A1 | 11/2007 | Entov et al. | |
| 2009/0166030 A1 | 7/2009 | Zhuravlev et al. | |
| 2009/0179649 A1 | 7/2009 | Schmidt | |
| 2009/0250216 A1 | 10/2009 | Bicerano | |
| 2009/0288820 A1 | 11/2009 | Barron et al. | |
| 2010/0017139 A1 | 1/2010 | Adams et al. | |
| 2010/0038083 A1 | 2/2010 | Bicerano | |
| 2010/0147512 A1 | 6/2010 | Cramer et al. | |

FOREIGN PATENT DOCUMENTS

| | | |
|---|---|---|
| WO | WO2009151891 | 12/2009 |
| WO | WO2010019424 | 2/2010 |

OTHER PUBLICATIONS

Brian Anderson, et al., Autonomous Nodes for Time Lapse Reservoir Seismic: An Alternative to Permanent Seabed Arrays, PESA News, Jun./Jul. 2009, pp. 52-54.

* cited by examiner

*Primary Examiner* — Tung X Nguyen

(74) *Attorney, Agent, or Firm* — Conocophillips Company

(57) ABSTRACT

This invention relates to a method for evaluating and measuring the geometry of a fracture.

10 Claims, No Drawings

FRACTURE DETECTION VIA SELF-POTENTIAL METHODS WITH AN ELECTRICALLY REACTIVE PROPPANT

CROSS-REFERENCE TO RELATED APPLICATIONS

This application claims priority benefit under 35 U.S.C. Section 119(e) to U.S. Provisional Patent Ser. No. 61/429,938 filed on Jan. 5, 2011 the entire disclosure of which is incorporated herein by reference.

FIELD OF THE INVENTION

This invention relates to a method for evaluating and measuring the geometry of a fracture.

BACKGROUND OF THE INVENTION

Retrieving hydrocarbons from subterranean reservoirs is becoming more difficult, as existing reserves are depleted and production becomes more expensive. It has been estimated that mature fields account for up to 70% of the world's production or more. In order to increase production, reservoirs are often hydraulically fractured to stimulate production of hydrocarbons from the wellbore. Hydraulic fractures are created in subterranean formations by hydraulically injecting water or high viscosity fluid (also referred to as fracturing fluid) containing a proppant at a high flow rate into a wellbore and forcing the fracturing fluid against the formation strata by pressure. The formation strata or rock is forced to crack, creating or enlarging one or more fractures. The proppant subsequently prevents the fracture from closing completely and thus provides improved flow of recoverable fluid, i.e., oil, gas or water.

Because aging wells are often produced from multiple intervals, some very thin, the ability to locate these stimulation treatments with pinpoint accuracy is key to more effective remediation and increased recovery. Also in more "non-conventional" plays, like the fractured shales, the quality and extent of the fracture job is paramount to the financial success of the well and the play. However, few methods exist for visualizing fracture length, proppant penetration, and estimated flow in the created fracture is required to accurately assess production capabilities and the need for further remediation before production is initiated.

Numerous techniques exist for detecting the fracture geometry of a well using various imaging techniques. For example, Hocking et al., U.S. Pat. No. 6,330,914 provides a method for monitoring a propagating vertical fracture in a formation by injecting conductive fracture fluid into the formation to initiate and propagate the fracture; energizing the fracture fluid while the fracture propagates; and measuring the inducted electromagnetic field parameters to judge about the fracture development and geometry. Further, McCarthy, et al., WO2007013883, introduces a target proppant; transmits electromagnetic radiation from about 300 megahertz-100 gigahertz; and analyzes a reflected signal from the target particle to determine fracture geometry. Lastly, Nguyen et al., U.S. Pat. No. 7,073,581, describes an electroconductive proppant compositions and related methods of obtaining data from a portion of a subterranean formation. These techniques focus on detecting data utilizing a series of geophones connect to conventional seismic survey equipment, which converts ground movement, i.e., displacement, into voltage.

Additionally, fractures can be monitored and approximately mapped three-dimensionally during the fracturing process by a micro-seismic technique. The micro-seismic technique detects sonic signatures from rocks cracking during the fracturing process. The setup of this technique is prohibitively expensive, and the data generated tends to be relatively inaccurate due to high background noise. Further, the process can only be performed during the fracturing process and cannot be repeated thereafter.

Although these techniques yield useful information, their usefulness is limited to fracture locations near the wellbore and yields little if any useful information relating to the dimensions of the fracture as it extends into the formation. Therefore, a need exists for monitoring and mapping fractures as they extend away from the oil or gas well.

SUMMARY OF THE INVENTION

In an embodiment, a method for evaluating and measuring the geometry of a fracture includes: (a) injecting a proppant into the fracture, wherein at least a portion of the proppant is electrically reactive, wherein the proppant may be coated with an electrically reactive coating or contains particles of electrically reactive material, wherein the proppant reacts to an electrically active liquid; (b) exposing the proppant to the electrically active liquid creating an electrical signal, wherein the liquid is natural brine, drilling fluids, fresh water or combinations thereof; (c) detecting the electrical signal with at least one sensor; (d) converting the electrical signal into a voltage signal compatible with geophysical survey equipment; and (e) evaluating and measuring the geometry of the fracture using the data from step (d).

In another embodiment, a method for evaluating and measuring the geometry of a fracture includes: (a) injecting a proppant into the fracture, wherein at least a portion of the proppant electrically reactive; (b) exposing the proppant to an electrically active liquid creating an electrical signal; (c) detecting the electrical signal with at least one sensor; (d) converting the electrical signal into a voltage signal compatible with geophysical survey equipment; and (e) evaluating and measuring the geometry of the fracture using the recorded data from step (d).

In a further embodiment, a method for evaluating and measuring the geometry of a fracture includes: (a) injecting a proppant into the fracture, wherein at least a portion of the proppant is electrically reactive, wherein the proppant may be coated with an electrically reactive coating or contains particles of electrically reactive material, wherein the proppant reacts to borehole fluids; (b) exposing the proppant to an electrolyte liquid creating an electrical signal; (c) detecting the electrical signal with at least one sensor; (d) converting the electrical signal into a voltage signal compatible with geophysical survey equipment; and (e) evaluating and measuring the geometry of the fracture using the data from step (d).

In yet another embodiment, a method for evaluating and measuring the geometry of a fracture includes: (a) injecting a proppant into the fracture, wherein at least a portion of the proppant is electrically reactive; (b) exposing the proppant to an electrolyte liquid creating an electrical signal; (c) detecting the electrical signal with at least one sensor; (d) converting the electrical signal into a voltage signal compatible with geophysical survey equipment; and (e) evaluating and measuring the geometry of the fracture using the data from step (d).

DETAILED DESCRIPTION OF THE INVENTION

Reference will now be made in detail to embodiments of the present invention. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a further embodiment. Thus, it is intended that the present invention cover such modifications and variations that come within the scope of the appended claims and their equivalents.

The present invention provides for the injection of an electrically reactive solid or coated proppant into a fracture, which conducts electrons when exposed to natural brine, hydrocarbons, drilling fluids, fresh water, or combinations thereof. The signal produced as a result is sent to at least one sensors and subsequently sent to a data recorder for fracture mapping and monitoring purposes.

As used herein a "proppant" is a composition of sized particles mixed with fracturing fluid to open and/or hold fractures open during and after a hydraulic fracturing treatment. In addition to naturally occurring sand grains, the sized proppant particles can be man-made or specially engineered particles, such as resin-coated sand or high-strength ceramic materials like sintered bauxite. Proppant particles are carefully sorted for size and sphericity to provide an efficient conduit for hydrocarbon production to the wellbore.

The proppant may be coated with an "electrically conductive coating." As used herein, an electrically conductive coating can be any metal, conductive polymer, or the like that conduct electrons. In an embodiment, the electrically conductive coating is sulfide based. For example, the proppant can be $FeS_2$ or $ZnS_2$. Appropriate sized grains of the sulfide material can be included in the main proppant charge. Additionally, the coating may be anodized, galvanized, electroplated, hot-dipped, charge-dipped, chemically applied, arc-sprayed, electrostatically applied and the like. The electrically conductive coating conducts electrons when exposed to an electrically active liquid. The electrically active liquid can include natural brine, drilling fluids, fresh water or combinations thereof at a depth to conduct electrons. The sulphides when exposed to the electrically active liquid of the appropriate chemistry can become, for example, a mild battery creating its own electrical charge.

The proppant may also be an "electrically reactive" material within the brine or fluids within the borehole. These electrically reactive materials may be natural materials such as bornite, chalcopyrite, sphalerite, pentlandite or may be a synthetic material with similar reactive properties. In an embodiment, the electrically reactive material spontaneously reacts with brine and/or fluids present in the borehole to free electrons and form a weak battery effect, i.e., a "self potential anomaly". Appropriately sized grains of the desired material can also be included in the proppant charge. Additionally, the electrically reactive material may include a coating that may be anodized, galvanized, electroplated, hot-dipped, charge-dipped, chemically applied, arc-sprayed, electostatically applied and the like. The electrically reactive material releases electrons when exposed to an electrically active liquid. The electrically active liquid can include natural brine, drilling fluids, fresh water or combinations thereof at a depth to conduct electrons.

An electrical signal transmitted into the fracture charges the electrically active proppant. The electrical signal can also comprise, for example, an electrical signal, an electromagnetic signal, a sonic signal, a microwave signal, or any other signal suitable for the intended purpose. Alternatively, an electrically active liquid can induce an electrical signal. The electrically active liquid can include, for example, natural brine, drilling fluids, doped fresh water and combinations thereof. The electrical signal is conducted along and reflected back from the electrically active proppant and detected by at least a grid of sensors.

The grid of sensors can measure, for example, self potential, used for geophysical surveys. The grid of sensors can either be externally disposed, i.e., surface based, or internally disposed, i.e., within the wellbore. The grid of sensors may be arranged in a 2D or a 3D grid configuration on the surface over the area around the wellbore or can be located at multiple levels in the wellbore. The extent of the grid of sensors can be adjusted to suit the resolution and read requirements of the individual well or the geographical and geophysical constraints of the project. The "grid" does not have to be an actual grid per se and may be non-uniformly spaced due to either design or natural and cultural obstacles. The grid of sensors is time stamped and synchronized to global positioning time (GPS), in order for a baseline survey can be readily measured. When deployed on the surface, the sensors can be referred to as the sensor package or receivers.

It may be necessary to convert the data provided by the grid of sensors into voltage based signals compatible with conventional 24 bit seismic survey equipment, such as a conventional seismic recorder. By converting the electrical methods data from the sensor into an electrical signal that the seismic recorder can accurately measure, the seismic data node can be used to record simultaneous measurements of the desired geophysical field in real time. In an embodiment, a seismic interface box is utilized which understands the low voltages from field equipment and converts the data into a voltage signal that can then be digitized by the seismic data equipment and stored. For example, provisional patent applications filed by ConocoPhillips Company entitled "Electrical Methods Seismic Interface Box" demonstrate a method and apparatus for evaluating the geometry of a fracture, specifically relating to an electric methods seismic interface box and a method of using the apparatus to record electrical methods geophysical data.

The converted data is then sent to the geophysical survey equipment as a compatible voltage signal. In an embodiment, the geophysical survey equipment includes a conventional wire based seismic recording system. The conventional wire based seismic data recorder can be telemetry the data at or near real time back to the recorder if needed. In another embodiment, the seismic data recorder can be a wireless or a radio based recording system. This system delivers the data in real time, near real time, or stores the data locally and controls the data from the recorder. In yet another embodiment, the seismic survey equipment includes an autonomous seismic node. The autonomous seismic node is a data collection unit that works independently of other units and is not required to be controlled by radio telemetry or similar techniques during the course of the seismic survey. The autonomous seismic node may include a receiver, a field timer, a standard timer, a transmitter and a battery. In an embodiment, data is stored in a temporary drive at the autonomous seismic node until it is transferred either physically or wireless for data analysis. Autonomous or semi-autonomous seismic nodes may also be utilized in the present invention.

In an embodiment, the grid of receivers may be deployed around the rig and the baseline or "regional" field may be measured prior to the start of the fracture, thus establishing the natural conductivity, resistivity and self potential of the earth in the area of the fracture. These measurements can be repeated several times and summed to get a better signal to noise ratio for the baseline survey. The fracture is then started and the receivers continuously record the developing field as the material begins to react with the borehole fluids. As the fracture progresses and the materials are injected into the Earth the field develops both the "regional" field and the field associated with the injected material and the fracture, i.e., the "residual" field. By measuring the electrical field after completion of the fracture and monitoring the development of the electrical charge, a maximum would develop as the fracture material fully reacts with the borehole and formation fluids. By taking the difference between the starting field and the final field, a "residual" field caused by the fracture is created and can then be modeled and inverted for determining the shape and geophysical parameters of the body. Because the chemistry, depth, location and volume of fracture material are used, the inversion is fairly constrained and can be accurately determined.

In yet another embodiment, the grid of receivers may be deployed around the rig and the baseline or "regional" field can be measured prior to the start of the fracture, thus establishing the natural conductivity, resistivity and self potential of the earth in the area of the fracture. These measurements can be repeated several times and summed to get a better signal to noise ratio for the baseline survey. The fracture is then started and recorders may be utilized to record the formation data. However, the electrically reactive material does not necessarily react with normal borehole fluids. Upon completion of the fracture, the new baseline measurement can be acquired. Once the new baseline measurement is established an electrolyte solution can be pumped into the well that causes the fracture material to react and generate an electrical charge and a measureable current. This charge or current is the "residual" field and the data can be inverted for the fracture shape and location.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Ser. No. 12/621,789 filed Nov. 19, 2009, Cramer, et al., "Controlled Source Fracture Monitoring."
2. U.S. Pat. No. 6,330,914 Hockings et al., "Method and Apparatus for Tracking Hydraulic Fractures in Unconsolidated and Weakly Cemented Soils and Sediments."
3. WO2007013883 published Feb. 1, 2007, Hexion Specialty Chemicals, "Method of Estimating Fracture Geometry, Compositions and Articles Used for the Same."

The invention claimed is:
1. A method for evaluating and measuring the geometry of a fracture comprising:
    a. injecting a proppant into the fracture, wherein at least a portion of the proppant is electrically reactive, wherein the proppant may be coated with an electrically reactive coating or contains particles of electrically reactive material, wherein the proppant reacts to an electrically active liquid;
    b. exposing the proppant to the electrically active liquid creating an electrical signal, wherein the liquid is natural brine, drilling fluids, fresh water or combinations thereof;
    c. detecting the electrical signal with at least one sensor;
    d. converting the electrical signal into a voltage signal compatible with geophysical survey equipment; and
    e. evaluating and measuring the geometry of the fracture using the data from step (d).
2. A method for evaluating and measuring the geometry of a fracture comprising:
    a. injecting a proppant into the fracture, wherein at least a portion of the proppant electrically reactive;
    b. exposing the proppant to an electrically active liquid creating an electrical signal;
    c. detecting the electrical signal with at least one sensor;
    d. converting the electrical signal into a voltage signal compatible with geophysical survey equipment; and
    e. evaluating and measuring the geometry of the fracture using the recorded data from step (d).
3. The method according to claim 2, wherein the proppant is coated with an electrically reactive coating.
4. The method according to claim 2, wherein the proppant contains particles of electrically reactive material.
5. The method according to claim 2, wherein the proppant reacts to the electrically active liquid.
6. The method according to claim 2, wherein the electrically active liquid is natural brine, drilling fluids, fresh water or combinations thereof.
7. A method for evaluating and measuring the geometry of a fracture comprising:
    a. injecting a proppant into the fracture, wherein at least a portion of the proppant is electrically reactive, wherein the proppant may be coated with an electrically reactive coating or contains particles of electrically reactive material, wherein the proppant reacts to borehole fluids;
    b. exposing the proppant to an electrolyte liquid creating an electrical signal;
    c. detecting the electrical signal with at least one sensor;
    d. converting the electrical signal into a voltage signal compatible with geophysical survey equipment; and
    e. evaluating and measuring the geometry of the fracture using the data from step (d).
8. A method for evaluating and measuring the geometry of a fracture comprising:
    a. injecting a proppant into the fracture, wherein at least a portion of the proppant is electrically reactive;
    b. exposing the proppant to an electrolyte liquid creating an electrical signal;
    c. detecting the electrical signal with at least one sensor;
    d. converting the electrical signal into a voltage signal compatible with geophysical survey equipment; and
    e. evaluating and measuring the geometry of the fracture using the data from step (d).

9. The method according to claim 8, wherein the proppant is coated with an electrically reactive coating.

10. The method according to claim 8, wherein the proppant contains particles of electrically reactive material.

* * * * *